C. A. LEGGETT & A. W. KERSEY.
END GATE FOR WAGONS.
APPLICATION FILED NOV. 20, 1916.
1,227,917.
Patented May 29, 1917.
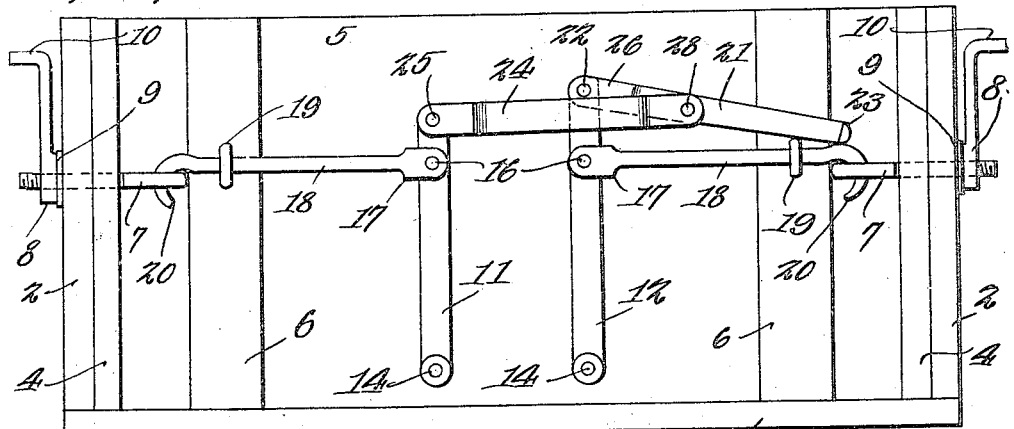
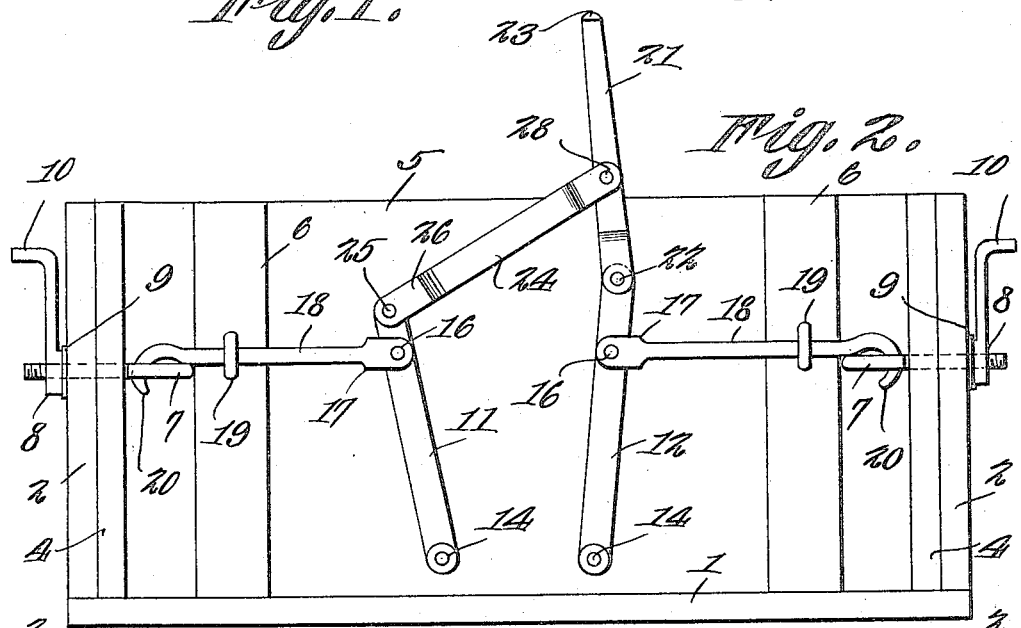
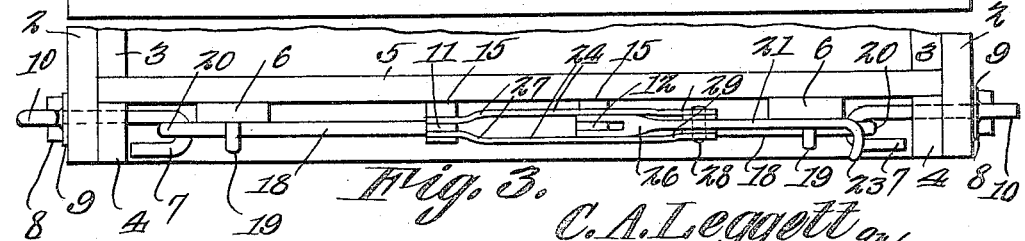

UNITED STATES PATENT OFFICE.

CHRISTOPHER A. LEGGETT AND AMOS W. KERSEY, OF EMMETT, IDAHO.

END-GATE FOR WAGONS.

1,227,917. Specification of Letters Patent. Patented May 29, 1917.

Application filed November 20, 1916. Serial No. 132,458.

*To all whom it may concern:*

Be it known that we, CHRISTOPHER A. LEGGETT and AMOS W. KERSEY, citizens of the United States, residing at Emmett, in the county of Gem, State of Idaho, have invented a new and useful End-Gate for Wagons, of which the following is a specification.

The device forming the subject matter of this application is an end gate, and the invention aims to improve the mechanism which, being assembled with the end gate, engages the side boards of the wagon box to hold the end gate in place and to prevent the side boards from spreading.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—

Figure 1 shows in end elevation, a wagon box equipped with the device forming the subject matter of this application, the parts being in locked positions;

Fig. 2 is an end elevation showing a wagon box equipped with the device forming the subject matter of this application, the parts being in unlocked positions;

Fig. 3 is a top plan showing a portion of a wagon box whereunto the device forming the subject matter of this application has been applied, the parts being in locked positions.

The structure herein disclosed may be assembled with wagon boxes and end gates of widely different sorts, but by way of illustration there has been shown a portion of a wagon box including a platform 1 and side boards 2. The side boards 2 are equipped with upright guides 3 and 4 between which are engaged the ends of a vertically removable end gate 5 provided on its outer face with cleats 6. Hook bolts 7 or like attaching elements pass through the guides 4 and through the side boards 2. Lever nuts 8 are threaded onto the stems of the hook bolts 7, and washers 9 are interposed between the lever nuts 8 and the outer faces of the side boards 2; this spaces the handles 10 of the lever nuts 8 from the side boards 2, so that the lever nuts may be manipulated readily.

The invention includes a radius rod 11 and a radius rod 12, the rod 12 being slightly longer than the rod 11. The radius rods 11 and 12 are mounted to swing on pivot elements 14 connected with the end gate 5, the pivot elements carrying spacers 15, so that the radius rods 11 and 12 may swing clear of the end gate 5. Intermediate their upper and lower ends, and relatively near to their upper ends, the radius rods 11 and 12 carry pivot elements 16 upon which are mounted the bifurcated ends 17 of connections 18 which may be rods. The connections 18 slide longitudinally in eyes or supports 19 mounted on the cleats 6. At their outer ends, the connections 18 are supplied with hooks 20 engaged with the inner ends of the hook bolts 7.

The numeral 21 designates a lever, the inner end of which is provided with bifurcations 26 spanning the upper end of the radius rod 12 and secured thereto by a pivot element 22 on which the lever 21 is adapted to swing vertically. At its outer end, the lever 21 is supplied with a rearwardly projecting handle 23 which rests on the hook 20 of the right hand connections 18 (Fig. 1) when the parts are in locked positions. At 24 there appears a pair of links, the inner ends of which are pivoted as shown at 25 to the upper end of the radius rod 11, the links lying on opposite sides of the radius rod. The links 24 are offset as shown at 27, so that they will clear the bifurcated end 26 of the lever 21. A pivot element 28 unites the outer ends of the links 24 with the intermediate portion of the lever 21, and washers 29 on the pivot element 28 are interposed between the ends of the links 24 and the lever 21, to enable the links 24 to swing clear of the bifurcated end 26 of the lever 21 when the lever is operated.

When the parts are in the locked position of Fig. 1, the rods or connections 18 are drawn toward each other, and the hooks 20 are securely engaged with the hook bolts 7. The links 24 stand in an approximately horizontal position; the pivot element 28 which unites the links 24 with the lever 21 lies below the pivot element 22 which unites the lever 21 with the radius rod 12, and the rearwardly projecting handle 23 of the lever 21 rests on the hook 20 of the right hand connection 18. The parts are so arranged, under the circumstances above pointed out, that the end gate 5 is firmly held in place, the side boards 2 being drawn inwardly against the extremities of the end gate.

When it is desired to remove the end gate 5, the lever 21 is swung upwardly into the position of Fig. 2, and then the end gate may be raised out of the guides 4 3, the hooks 20 on the ends of the connections 18 moving upwardly out of the hook bolts 7.

When the lever 21 is swung downwardly into the position shown in Fig. 1 of the drawings, the handle 23 of the lever not only engages the hook 20 of the right hand connection 18, but, as well, the lever 21 rests on the right hand guide or eye 19 of Fig. 1. One or the other of the coöperating elements 19 or 20 will, therefore, at all times be efficient as a stop for limiting the downward swinging movement of the free end of the lever 21.

Having thus described the invention, what is claimed is:—

1. In a device of the class described, an end gate; a pair of upright radius rods pivoted at their lower extremities to the end gate; connections extended laterally in opposite directions from the radius rods and attached at their inner ends thereto; a link pivoted at one end to one radius rod; a lever pivoted at one end to the other radius rod; and a pivot element uniting the other end of the link with the intermediate portion of the lever.

2. In a device of the class described, an end gate; a pair of upright radius rods pivoted at their lower extremities to the end gate, one radius rod being longer than the other; connections extended laterally in opposite directions from the radius rods and attached at their inner ends thereto; a link pivoted at one end to the upper extremity of the shorter radius rod; a lever pivoted at one end to the upper extremity of the longer radius rod; and a pivot element uniting the other end of the link with the intermediate portion of the lever.

3. In a device of the class described, an end gate; a pair of upright radius rods pivoted at their lower ends to the end gate, one radius rod being longer than the other; connections extended laterally in opposite directions from the radius rods and attached at their inner ends thereto; a link pivoted at one end to the upper extremity of the shorter radius rod; a lever pivoted at one end to the upper extremity of the longer radius rod; a pivot element uniting the other end of the link with the intermediate portion of the lever; and guides carried by the end gate and receiving the connections slidably.

4. In a device of the class described, an end gate; coöperating elements comprising a pair of guides mounted on the end gate, and connections slidable in the guides; a pair of upright radius rods pivoted at their lower extremities to the end gate, the inner ends of the connections being pivotally assembled with the radius rods, one radius rod being longer than the other; a link pivoted at one end to the upper end of the shorter radius rod; a lever pivoted at one end to the upper extremity of the longer radius rod and being provided with an extension coacting with one of said coöperating elements, to limit the downward swinging movement of the lever; and a pivot element uniting the other end of the link with the intermediate portion of the lever.

In testimony that we claim the foregoing as our own, we have hereto affixed our signatures in the presence of two witnesses.

CHRISTOPHER A. LEGGETT.
AMOS W. KERSEY.

Witnesses:
F. A. DE CLARK,
H. K. EAGLESON.